(No Model.) 2 Sheets—Sheet 2.
C. C. HENDERSON.
SEED PLANTER.
No. 369,286. Patented Aug. 30, 1887.
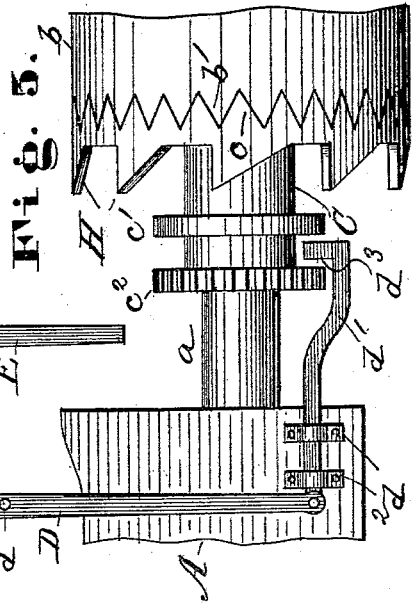
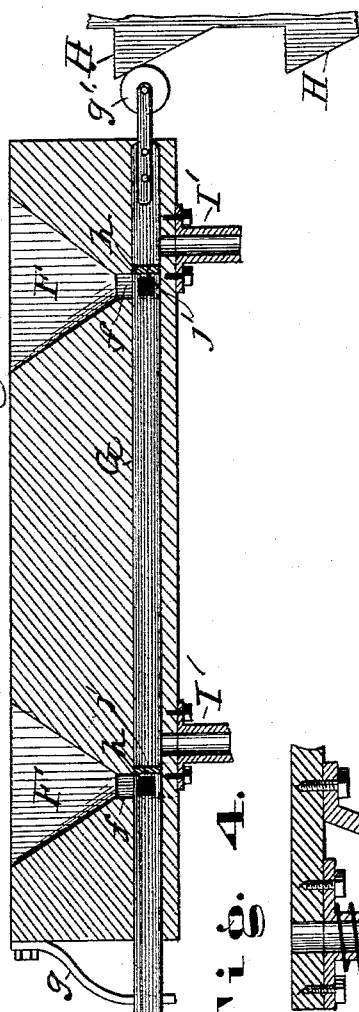
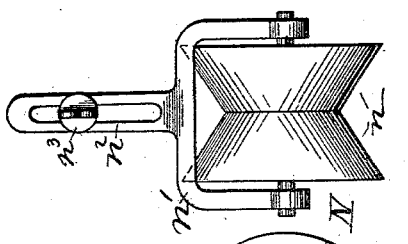
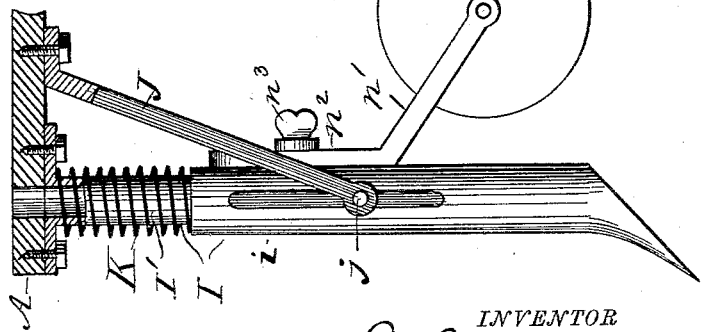
WITNESSES
INVENTOR
C. C. Henderson
by I. H. MacDonald
Attorney

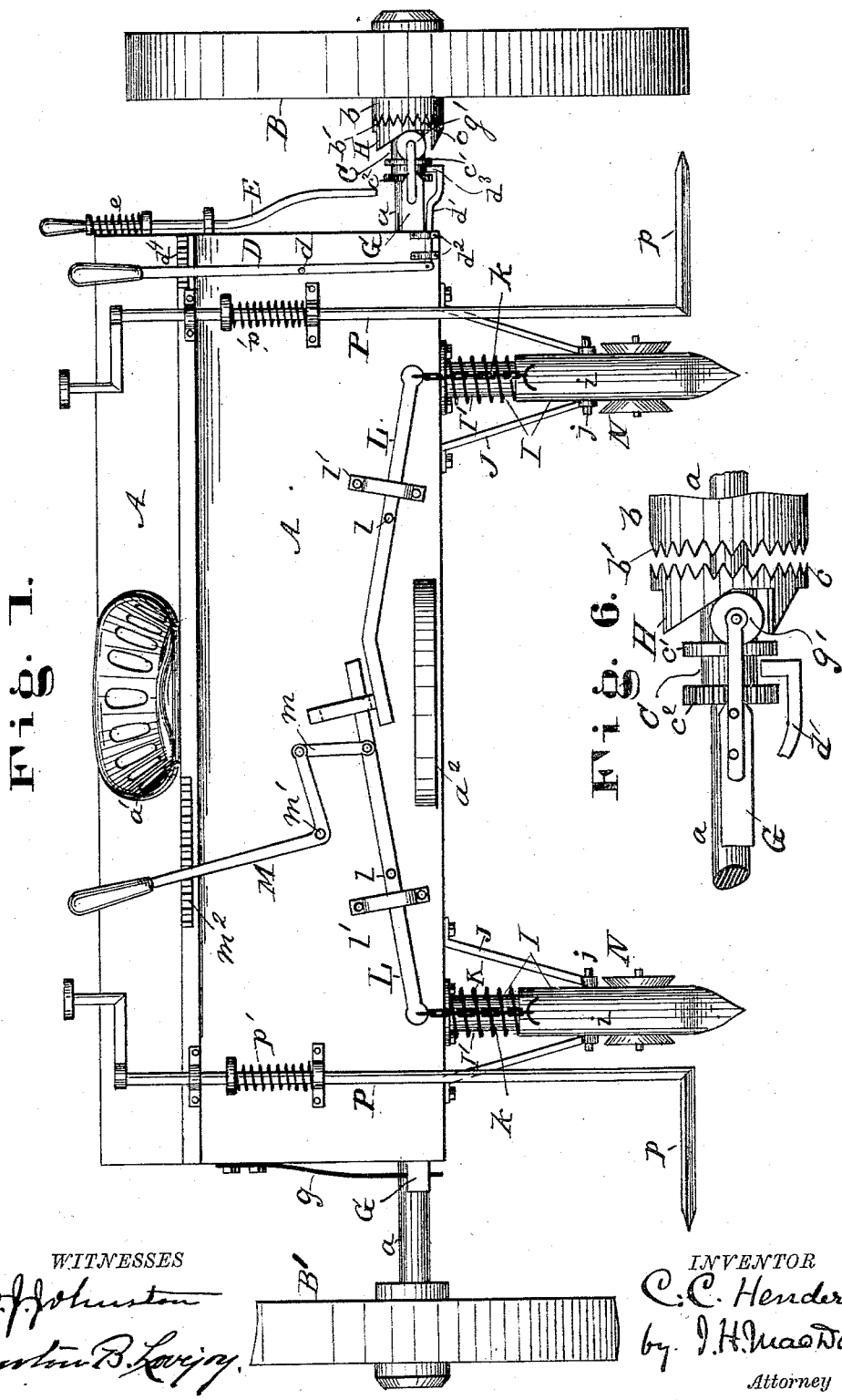

UNITED STATES PATENT OFFICE.

CHARLES CARROLL HENDERSON, OF JAMESTOWN, NEW YORK.

SEED-PLANTER.

SPECIFICATION forming part of Letters Patent No. 369,286, dated August 30, 1887.

Application filed January 29, 1887. Serial No. 225,876. (No model.)

*To all whom it may concern:*

Be it known that I, CHARLES CARROLL HENDERSON, a citizen of the United States, residing at Jamestown, in the county of Chautauqua and State of New York, have invented certain new and useful Improvements in Seed-Planters; and I do hereby declare the following to be a full, clear, and exact description of the invention, such as will enable others skilled in the art to which it appertains to make and use the same.

My invention relates to improvements in seeders and planters, the essential objects being to provide a machine of simple construction and easily actuated that will automatically plant the grain in proper quantities and at equal intervals of time during one rotation of the driving and actuating wheel, and in which the drills or planting-tubes will automatically accommodate themselves to the surface of the ground over which the machine travels while in operation.

The invention consists in the construction and novel arrangement of parts, hereinafter described, illustrated in the drawings, and pointed out in the claims hereto appended.

In the drawings forming part of this specification, Figure 1 represents a front view of the machine. Fig. 2 represents a vertical longitudinal section of the lower portion of the body of the machine, showing the actuating-cams of the sleeve straightened out to illustrate more fully the action of the parts. Fig. 3 represents an enlarged view of the hub of the actuating-wheel, the clutch connected therewith, and a part of the clutch-operating mechanism. Fig. 4 represents a detail view of one of the drills or planting-tubes and the adjustable wheel to regulate the depth of insertion of said drill in the ground. Fig. 5 represents an edge view of one of said adjustable wheels and its supporting-frame attached thereto. Fig. 6 is a detached, detailed, and partly-sectional view of the actuating-hub, the clutch-sleeve, and the long valve-rod for the seed-boxes.

Referring to the accompanying drawings by letter, A designates the frame of the machine, having the axle $a$ journaled in bearings secured in proper position to its under surface.

$a'$ is the driver's seat, secured to the top of the main frame A centrally between the wheels. $a^2$ is a suitable foot-rest a proper distance below the seat.

B B' are the wheels fixed upon and turning with the axle, or they may be arranged to turn upon the axle, the wheel B being the actuating-wheel of the machine. The hub $b$ of the wheel B has formed upon its inner edge the equidistant teeth $b'$, adapted to engage with corresponding teeth on the clutch-sleeve, hereinafter described.

C is the clutch-sleeve sliding upon the axle $a$ between the frame of the machine and the wheel B. The outer edge of the sleeve is provided with teeth $c$, adapted to engage with the teeth $b'$ of the hub $b$. When the teeth are so engaged, the sleeve is caused to rotate with the hub, and when the sleeve is disengaged from the hub the axle may turn in the sleeve without rotating the same, except slightly by friction; or it may be stationary, in which case the hub turns on the axle.

$c'$ is a collar formed at a suitable point upon the sleeve C, and $c^2$ is a similar collar on the sleeve to the inner side of the collar $c'$, and having its edge provided with teeth similar to those of a gear wheel or rack.

D is a lever pivoted at $d$ on the main frame and having the end of its upper arm formed into a handle within easy reach of the driver. The lever D has pivoted to the end of its lower arm an actuating-rod, $d'$, which slides in the directing loops or staples $d^2$, secured to the main frame. $d^3$ is the end of said actuating-rod, bent so as to enter between the collars $c'$ and $c^2$ of the clutch-sleeve. The driver, by pulling the handle of the lever D toward himself, can engage the clutch-sleeve with the hub $b$ of the actuating-wheel B. The upper arm of the lever D is adapted to engage between the teeth of a rack-bar, $d^4$, secured to the main frame. By means of this arrangement the said lever can engage the clutch-sleeve with the hub of the actuating-wheel and hold it engaged thereto, or can keep it disengaged therefrom, at the will of the driver. When the clutch-sleeve is disengaged from the hub $b$ and has its teeth out of contact with the teeth of the same, a rod, E, has its point ready to engage between the teeth of the collar $c^2$. The said rod moves reciprocally in looped brackets secured to the main frame, and has a coiled spring, $e$, around it at a proper point between a collar on the rod and the upper looped bracket standing out from the main frame. The rod E is moved upward by the spring, and has its point engaged between the teeth of the collar $c^2$ when the sleeve is disengaged from the hub by pressing downward, and prevents the former from rotating with the axle by friction.

F F are seed-boxes made in the lower part of the main frame A, and having the outlets $f\,f$, as shown in Fig. 2.

G is a long transverse valve-rod passing through a suitable channel in the bottom of the main frame, and having attached to its end opposite the actuating-wheel the lower end of a leaf-spring, $g$, which has its upper end secured to the side of the main frame. The other end of the valve-rod is bifurcated, and has journaled between the arms of its bifurcation a friction-roller, $g'$, which runs over the triangular projections H, standing inward from the outer end of the sleeve C, the engaging teeth $c$ standing outward from said end. The spring $g$ keeps the friction-roller upon said projections, which reciprocate the valve-rod as the axle rotates. The valve-rod passes through the outlets $f$ of the seed-boxes, and is provided therein with the pockets or recesses $h\,h$, each capable of holding one planting of grain.

I' I' are the upper tubes of the vertical seed conveyers or drills I I. The lower tubes, $i\,i$, of the same slip upon the said upper tubes and are pointed below to enter the ground to a proper depth. (See Figs. 1 and 4.)

$j\,j$ are pins standing from the sides of the upper tubes at opposite points and passing through longitudinal slots in the lower tubes, $ii$, and J J are brace or stay rods with their lower ends secured to said pins and their upper ends to the floor or bottom of the main frame. As the valve-rod reciprocates, the pockets alternately enter and move out of the outlets $f\,f$, and each time they move out they convey a planting of grain to the adjacent tube I', secured to the main frame, and drop it into the mouth of the same.

$j'\,j'$ are scrapers, the edges of which level the grain in the recesses as the same pass out of the outlets of the seed-boxes into the tubes I'.

K K are coiled springs surrounding the parts of the upper tubes, I', above the corresponding lower tubes, $i$, to force the latter downward, and $k\,k$ are chains having their lower ends secured to loops or rings at proper positions on the lower tubes, $i\,i$, and their upper ends attached to the lower and outer ends of the levers L L, pivoted at $l$ on the main frame and passing through the guide-brackets $l'\,l'$, secured to the same. The said levers are loosely jointed at their inner meeting ends, the end of one passing through a slotted guide projection standing upward from the end of the other, and with one of them is connected the lower end of a lever, M, by a link-bar, $m$, which lever is pivoted at $m'$ on the main frame. The upper end of said lever is formed into a handle, and is within easy reach from the driver's seat, and its shaft is capable of being engaged by the teeth of the rack $m^2$. Thus the said lever may be retained in any desired position. When the lever M is pulled inward, the lower tubes of the planter or drill are moved upward on the upper tubes thereof. Thus the depth of the planting can be regulated, and also the tubes will accommodate themselves by slipping upward or downward on uneven ground, so as to keep the depths of the plantings equal.

N is a wheel to gage the depth of entrance of the points of each planting tube or drill in the earth. The wheel is grooved or concaved on its tread, as shown at $n$, Fig. 5, to serve as a coverer for the point of the tube, and is journaled in the arms of the supporting-frame $n'$, the stem $n^2$ of which is slotted longitudinally and secured to the lower tube of a drill or planter by means of the thumb set-screw $n^3$, which passes through the slot and engages in a threaded opening in the side of said lower tube. By means of the slot and screw the wheel can be adjusted up and down on the drill or planter, and will regulate its depth of entrance in the soil. The distance apart of the plantings is regulated by the number of triangular projections on the clutch-sleeve, as the more there are of the same the closer together will be the plantings. The valve-rod drops corn or grain in both rows formed by the machine simultaneously.

P is a marker-bar sliding in looped brackets secured to the main frame, having the marker-foot $p$, and surrounded between the upper bracket and a collar on its shaft by the upwardly-acting coiled spring $p'$. One of the marker-bars is provided on each side of the machine equally distant from the adjacent ends. I do not, however, confine myself to this form of marker, as a single marker may be found preferable, in which case I provide a downwardly-extending arm from the center of the main frame for supporting the marker-rod, the upper end of the marker-rod being bent outwardly and provided with a flange extending to the foot-rest of the driver, whereby it may be conveniently operated by his foot. In case this construction of marker is used, instead of the spiral spring $p'$, I employ a leaf-spring secured on the bottom of the main frame and attached to the marker-rod by a link. These bars can be pushed down by hand, so as to cause the feet to mark, which is preferably done only at the ends of rows, so as to indicate where to turn the machine, before which the lower tubes of the drills must be raised and held clear of the ground by the described mechanism. The marked spots at the ends of each row will indicate where to begin the adjacent row after the machine is turned around. The clutch-sleeve must also be ungeared from the hub just before turning, and while so ungeared the sleeve must be held by the described bar engaging its toothed collar till the friction-wheel on the end of the valve-rod rests in proper position, which is on the point of one of the triangular projections of the clutch-sleeve.

Having thus described my invention, what I claim as new, and desire to secure by Letters Patent, is—

1. In a seeder and planter, the combination of the drills or planting-tubes composed of the upper tubes secured to the main frame, the lower tubes sliding therein, the coiled spring surrounding the upper tubes between the main frame and the tops of the lower tubes, for the purpose of depressing the latter, and means for raising said lower tubes, substantially as described, with the seed-boxes and the reciprocating valve-rod operated by the drive-wheel through the intervention of the toothed and ratcheted clutch-sleeve, substantially as and for the purpose set forth.

2. In a seeder or planter, the drills or planting-tubes composed of the upper tubes secured to the main frame, the lower tubes sliding thereon and having their lower ends pointed to enter the earth, the coiled springs surrounding the upper drill-tubes between the main frame and the tops of the lower drill-tubes and acting to depress the latter, the system of levers, constructed substantially as described, to lift the lower drill-tubes, and the chains connecting the outer ends of the lower levers of said system with the upper ends of the lower drill-tubes, substantially as specified.

3. In a seeder and planter, the combination of the lower drill-tubes sliding on the upper drill-tubes, the pivoted lever having its edge arranged to engage a rack-bar secured to the machine, the two pivoted levers similar to each other, the meeting end of one sliding through a guide-slot in a projection from the meeting end of the other, the link-rod connecting one of said levers to the lower end of the pivoted lever engaging the rack-bar, and the chains connecting the outer ends of the similar levers with the upper ends of the lower drill-tubes, substantially as specified.

4. The combination, with the drills, each formed of a lower tube pointed at its lower end to enter the earth and an upper tube sliding within the lower tube, of the covering-wheels concave on their treads, the bifurcated frames in which said wheels are journaled, provided with slotted stems, and the thumb set-screws passing through the slots in said stems and engaging threaded openings in the lower drill-tubes, substantially as specified.

In testimony whereof I affix my signature in presence of two witnesses.

CHARLES CARROLL HENDERSON.

Witnesses:
L. W. WILTSIE,
N. R. LEWIS.